United States Patent [19]
Kubo et al.

[11] Patent Number: 5,671,458
[45] Date of Patent: Sep. 23, 1997

[54] PHOTOGRAPHIC CAMERA WITH EXPOSURE SIZE CORRECTED FOR POSITION OF EXIT PUPIL OF TAKING LENS

[75] Inventors: Takashi Kubo; Tsutomu Kimura; Hideto Shirane; Masayoshi Hirai, all of Saitama-ken, Japan

[73] Assignee: Fuji Photo Film Co., Ltd., Kanagawa-ken, Japan

[21] Appl. No.: 767,035

[22] Filed: Dec. 12, 1996

Related U.S. Application Data

[60] Continuation of Ser. No. 499,491, Jul. 7, 1995, abandoned, which is a division of Ser. No. 251,414, May 31, 1994, abandoned.

[30] Foreign Application Priority Data

| May 31, 1993 | [JP] | Japan | 5-129618 |
| Jun. 21, 1993 | [JP] | Japan | 5-149127 |
| Jun. 21, 1993 | [JP] | Japan | 5-149128 |
| Jun. 21, 1993 | [JP] | Japan | 5-149129 |

[51] Int. Cl.⁶ .................................................. G03B 17/02
[52] U.S. Cl. .................................................. 396/436
[58] Field of Search ................................. 396/72, 77, 78, 396/435, 436

[56] References Cited

U.S. PATENT DOCUMENTS

| 4,973,997 | 11/1990 | Harvey . | |
| 5,010,357 | 4/1991 | Misawa | 354/159 |
| 5,086,311 | 2/1992 | Naka et al. . | |
| 5,095,324 | 3/1992 | Aiyfuku et al. . | |
| 5,148,197 | 9/1992 | Kunishige . | |
| 5,305,051 | 4/1994 | Irie et al. | 354/441 |
| 5,307,111 | 4/1994 | Kurei | 354/402 |
| 5,379,084 | 1/1995 | Yamazaki | 354/195.12 |
| 5,412,443 | 5/1995 | Suzuka | 354/94 |
| 5,426,479 | 6/1995 | Ogawa | 354/159 |

FOREIGN PATENT DOCUMENTS 4-360136  12/1992  Japan .

*Primary Examiner*—Howard B. Blankenship
*Attorney, Agent, or Firm*—Young & Thompson

[57] ABSTRACT

A variable-exposure-size camera has an aperture member which defines an aperture through which a photographic film positioned behind the aperture member is exposed to light passing through a taking lens, and a pair of mask members which are disposed between the aperture member and the taking lens and are moved up and down toward and away from each other to change the effective upper and lower edges of the aperture, thereby narrowing the effective opening area of the aperture. The lower edge portion of the upper mask member and the upper edge portion of the lower mask member are bent toward the film surface so that the extreme edges of the edge portions which respectively define the upper and lower edges of the effective opening area of the aperture are positioned near the film surface.

4 Claims, 18 Drawing Sheets

PHOTOGRAPHIC CAMERA WITH EXPOSURE SIZE CORRECTED FOR POSITION OF EXIT PUPIL OF TAKING LENS

This application is a continuation of application Ser. No. 08/499,491, filed Jul. 7, 1995, now abandoned, which is a divisional application of Ser. No. 08/251,414, filed May 31, 1994, now abandoned.

BACKGROUND OF THE INVENTION

1. Field of the Invention

This invention relates to a photographic camera whose exposure size can be switched among various sizes such as Leica size, panoramic size, high-vision size and the like.

2. Description of the Prior Art

The exposure size (i.e., the size of the area to be actually exposed to light when photographing) is generally determined by the size of the aperture defined by an aperture member disposed close to the film.

The exposure size is determined in JIS, and in the case of the full size (Leica size) for 35 mm roll film, the exposure should be 24.0 mm to 24.8 mm in width and 36.0 mm to 36.8 mm in length. In the case of a 35 mm camera, the aperture member is sized so that the film is exposed to light in an area corresponding to Leica size.

Recently there has been put into practice a variable-exposure-size photographic camera in which the exposure size can be changed in a plurality of sizes such as panoramic size and high-vision size as well as Leica size. The standard sizes for Leica size, panoramic size and high-vision size in 35 mm film are 24.0 mm×36.0 mm, 13.3 mm×36.0 mm and 21.0 mm×36.0 mm, respectively and differ from each other only in width. Accordingly, in the variable-exposure-size photographic camera, the exposure size is changed, for instance, by providing upper and lower mask members in front of the aperture member and moving the mask members toward and away from each other. (See Japanese Unexamined Patent Publication No. 4(1992)-360136 and the like.) That is, when the exposure size is to be set to Leica size, the upper and lower mask members are retracted away from the aperture defined by the aperture member, when the exposure size is to be set to high-vision size, the upper and lower mask members are moved toward each other beyond the upper and lower edges of the aperture by a small amount, and when exposure size is to be set to panoramic size, the upper and lower mask members are moved toward each other to a position when they cover substantially a half of the aperture.

Further recently a telephoto lens and/or a zoom lens comes to be frequently used. Use of a zoom lens or a telephoto lens in a variable-exposure-size photographic camera gives rise to problems. For example, the exit pupil of the zoom lens moves back and forth and the angle between the optical axis and light beam passing near the edge of the aperture changes in response to zooming. When the aperture is defined by the aperture member itself, the movement of the exit pupil hardly affects the actual exposure size so long as the zoom ratio is in a limited range (e.g., within twice) since the space between the aperture member and the film surface is very small (not larger than 0.5 mm). However when the effective aperture is defined by the mask members, i.e., when the exposure size is set to panoramic size or high-vision size, the movement of the exit pupil largely affects the actual exposure size since the space between the film surface and the mask members is relatively large (normally about 1.5 mm).

If the actual exposure size changes with change in the position of the zoom lens, printing operation will be complicated.

Further in a roll film photographed with the variable-exposure-size camera, exposures of various sizes normally exist. When printing, a printing mask conforming to the size of each exposure must be selected. Normally the exposure size can be detected by width of the unexposed areas in the upper and lower edge portions of the film. However, depending on the image, for example, in the case of an image of a night view, edges of the image can be too blurred to determine the exposure size. In the camera disclosed in the above identified Japanese patent publication, the exposure size selected by the user is recorded on the film with a mark. However the method is difficult to apply 35 mm films which are most popularly used since the mark is recorded outside the image using a particular film format.

SUMMARY OF THE INVENTION

In view of the foregoing observations and description, the primary object of the present invention is to provide a variable-exposure-size camera in which desired size of exposures can be obtained irrespective of the position of the exit pupil of the taking the lens.

Another object of the present invention is to provide a variable-exposure-sire camera in which the exposure sizes are recorded on a film in a manner such that the record can be precisely read by a printing machine and/or the operator thereof.

A variable-exposure-size camera in accordance with one aspect of the present invention comprises an aperture member which defines an aperture through which a photographic film positioned behind the aperture member is exposed to light passing through a taking lens, and a mask means which is disposed between the aperture member and the taking lens and is movable to change an effective edge of the aperture, thereby narrowing the effective opening area of the aperture, and is characterized in that an edge portion of the mask means is bent toward the film so that the extreme edge of the edge portion which defines an edge of the effective opening area of the aperture is positioned near the surface of the film.

When the extreme edge of the edge portion which defines an edge of the effective opening area of the aperture is positioned near the surface of the film, the the actual exposure size is less affected by the position of the exit pupil and is substantially equal to the effective opening area of the aperture which is defined by the mask means irrespective of the position of the exit pupil. Accordingly, the expression "the extreme edge of the edge portion which defines an edge of the effective opening area of the aperture is positioned near the surface of the film" means that the extreme edge of the edge portion is positioned in a position such that the change in the exposure size with change in the position of the exit pupil is negligible.

In one embodiment, the mask means comprises a pair of mask members which are moved up and down toward and away from each other, and the lower edge portion of the upper mask member and the upper edge portion of the lower mask member are bent toward the film surface so that the extreme edges of the edge portions which respectively define the upper and lower edges of the effective opening area of the aperture are positioned near the film surface.

In another embodiment, the lower edge portion of the upper mask member and the upper edge portion of the lower mask member are supported to be movable toward and away from the film and when the mask members and the film are to be moved relative to each other, e.g., when the film is fed or when the mask members are moved to change the exposure size, the edge portions are moved away from the film not to scratch the photosensitive layer on the film.

The mask members may be arranged to define the left and right edges of the effective opening area of the aperture in addition to the upper and lower edges thereof.

A variable-exposure-size camera in accordance with another aspect of the present invention comprises an aperture member which defines an aperture through which a photographic film positioned behind the aperture member is exposed to light passing through a taking lens, and a mask means which is disposed between the aperture member and the taking lens and is driven by a mask drive means to change an effective edge of the aperture, thereby narrowing the effective opening area of the aperture, and is characterized by having an exposure size input means which is operated by a user of the camera and inputs the exposure size selected by the user, an exit pupil position detecting means which detects the position of the exit pupil of the taking lens and a controller which determines a position of the mask means where the actual exposure size precisely conforms to the exposure size selected by the user taking into account the position of the exit pupil of the taking lens and causes the mask drive means to move the mask means to the position determined.

When the position of the exit pupil is known, the position of the mask means where the actual exposure size precisely conforms to the exposure size selected by the user can be calculated and accordingly by correcting the position of the mask means according to the position of the exit pupil of the taking lens which varies according to the kind of the taking lens, the position of a zoom lens and the like, the actual exposure size can be precisely conformed to the exposure size selected by the user irrespective of the position of the exit pupil.

The controller may calculate the position of the mask means on the spot according to the exposure size selected by the user and the position of the exit pupil of the taking lens or may store a table in which the positions of the mask means are related to positions of the exit pupil for each exposure size and read out the position of the mask member according to the selected exposure size and the position of the exit pupil input.

A variable-exposure-size camera in accordance with a still another aspect of the present invention comprises an aperture member which defines an aperture through which a photographic film positioned behind the aperture member is exposed to light passing through a taking lens, a pair of mask members which are disposed between the aperture member and the taking lens and are moved toward and away from each other from opposite sides of the aperture to narrow the effective opening area of the aperture and an exposure size setting means which controls the position of the mask members and sets at least one smaller exposure size smaller than that defined by the aperture, and is characterized by having a recording means which, when the film is exposed with the exposure size set to said smaller exposure size, records information related to the exposure size on an area of the film which is masked by the mask member and is left unexposed to light.

In one embodiment, said recording means optically records said information. In another embodiment, said recording means is provided on each of the mask members.

DESCRIPTION OF THE PREFERRED EMBODIMENTS

Figure 1:
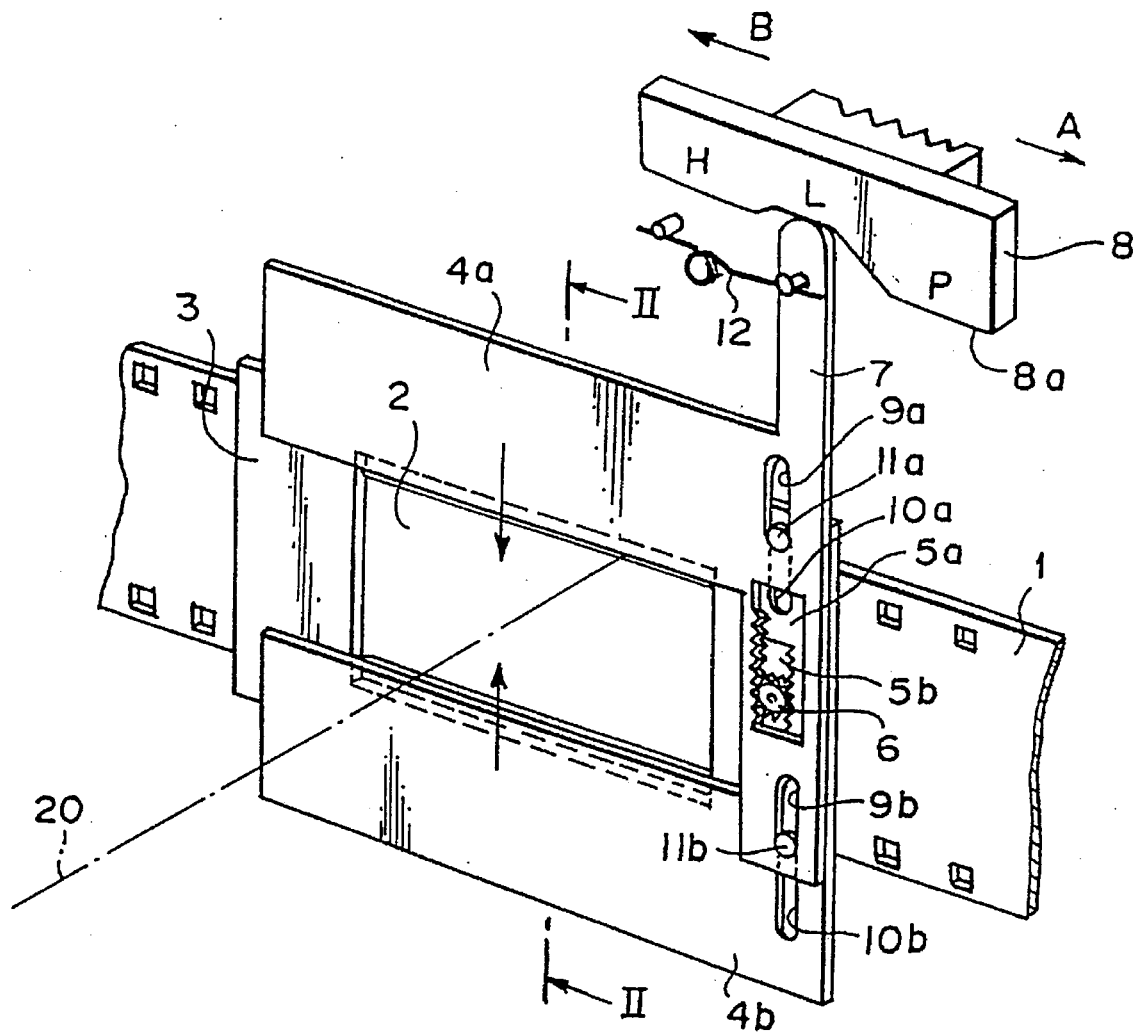
FIG. 1 is a schematic perspective view showing an important part of a variable-exposure-size camera in accordance with a first embodiment of the present invention.

In FIG. 1, an aperture member 3 having a rectangular aperture 2 is disposed in front of a photographic film 1. A pair of mask members 4a and 4b are provided in front of the aperture member 3 to be movable up and down toward and away from each other to change the effective opening area of the aperture 2. The optical axis 20 of a taking lens system (not shown, a zoom lens system in the particular embodiment) passes the center of the aperture 2.

The mask members 4a and 4b are substantially L-shaped, and the vertical portions thereof overlap each other. Elongated openings 5a and 5b are formed on the vertical portions of the respective mask members 4a and 4b to vertically extend in alignment with each other in the direction of thickness of the mask members 4a and 4b. Racks are formed on opposed vertical edges of the openings 5a and 5b and are in mesh with a pinion 6 supported for rotation on a camera body (not shown). A pair of elongated holes 9a and 9b are formed in the upper mask member 4a above and below the opening 5a and a pair of similar elongated holes 10a and 10b are formed in the lower mask member 4b above and below the opening 5b. A pin 11a fixed to the camera body extends through the upper holes 9a and 10a and a pin 11b fixed to the camera body extends through the lower holes 9b and 10b. With this arrangement, the upper and lower mask members 4a and 4b are moved up and down in opposite directions in synchronization with each other under the guide of the pins 11a and 11b. A cam member 8 is supported on the camera body for sliding movement in the directions of arrows A and B. The cam member 8 is provided with a cam surface 8a on the lower side thereof, and a cam follower extension 7 extends upward from the upper mask member 4a and is in abutment against the cam surface 8a of the cam member 8 under the force of a spring 12 which urges upward the cam follower extension 7.

The cam surface 8a has three portions at different levels, the highest at the central portion (corresponding to Leica size and marked with L), the lowest at the right side portion (corresponding to panoramic size and marked with P) and middle at the left side portion (corresponding to high-vision size and marked with H). When the cam follower extension 7 is in abutment against the cam surface 8a at the central portion thereof as shown in FIG. 1, the distance between the upper and lower mask members 4a and 4b are maximum and the effective opening area of the aperture 2 corresponds to Leica size. When the cam member 8 is moved rightward in the direction of arrow A from the position shown in FIG. 1, the cam follower extension 7 is displaced downward, which causes the upper and lower mask members 4a and 4b to respectively move downward and upward toward each other, thereby narrowing the effective opening area of the aperture 2. The effective opening area of the aperture 2 when the cam follower extension 7 is in abutment against the left side portion of the cam surface 8a corresponds to high-vision size. Similarly, when the cam member 8 is moved leftward in the direction of arrow B from the position shown in FIG. 1 and the extension 7 comes to abut against the right side portion of the cam surface 8a, the effective opening area of the aperture 2 is set to panoramic size.

Figure 2:
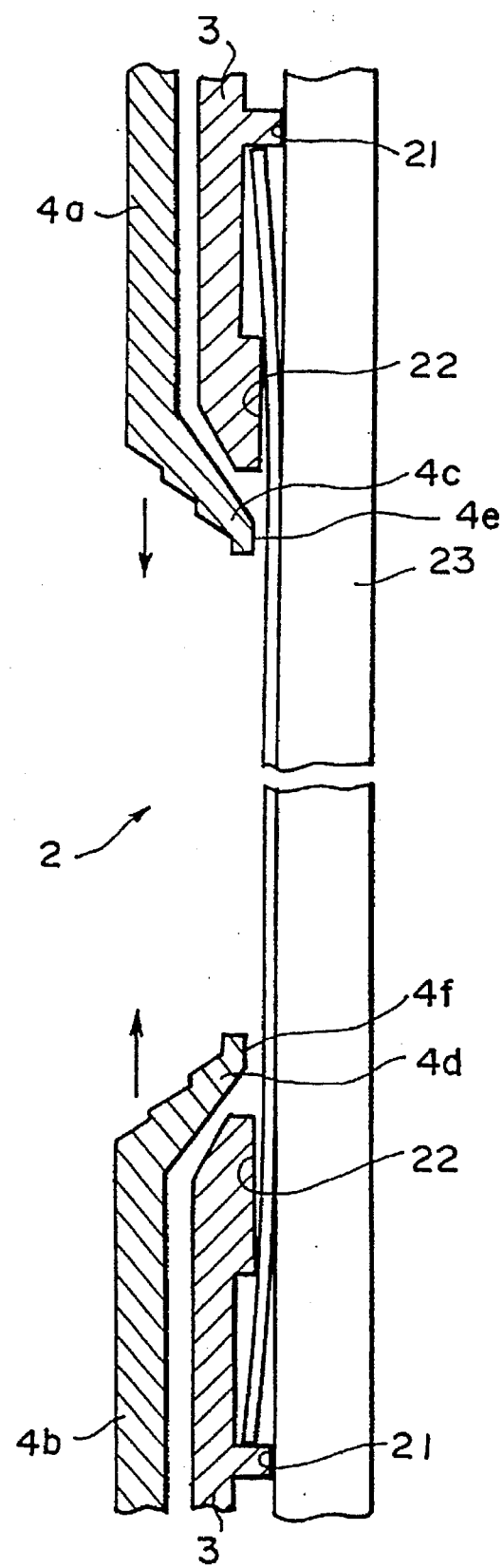
FIG. 2 is a fragmentary cross-sectional view taken along line II—II in FIG. 1.

As shown in FIG. 2, a pair of outer rails 21 are formed on the rear side of the aperture member 3 to extend in parallel to each other in the longitudinal direction of the film 1 and a pair of inner rails 22 are formed on the rear side of the aperture member 3 to extend in parallel to the outer rails 21 between the outer rails 21. The outer rails 21 abut against a pressure plate 23 on a back lid (not shown) to limit the position of the pressure plate 23, and the inner rails 22 abut against the upper and lower edge portions of the photosensitive surface of the film 1, whereby the film 1 is fed under the guide of the pressure plate 23 and the inner rails 22. The distance between the end surfaces of the outer and inner rails 21 ad 22 in the direction of the optical axis 20 is generally 0.2 to 0.5 mm.

As clearly shown in FIG. 2, the lower edge portion 4c of the upper mask member 4a and the upper edge portion 4d of the lower mask member 4b are bent toward the film surface so that their extreme edges 4e and 4f which define the upper and lower edges of the effective opening area of the aperture 2 are positioned near the surface of the film 1. The distance from the film surface of the surface of the extreme edges 4e and 4f facing the film 1 is substantially equal to that of the inner rails 22.

Figure 3:
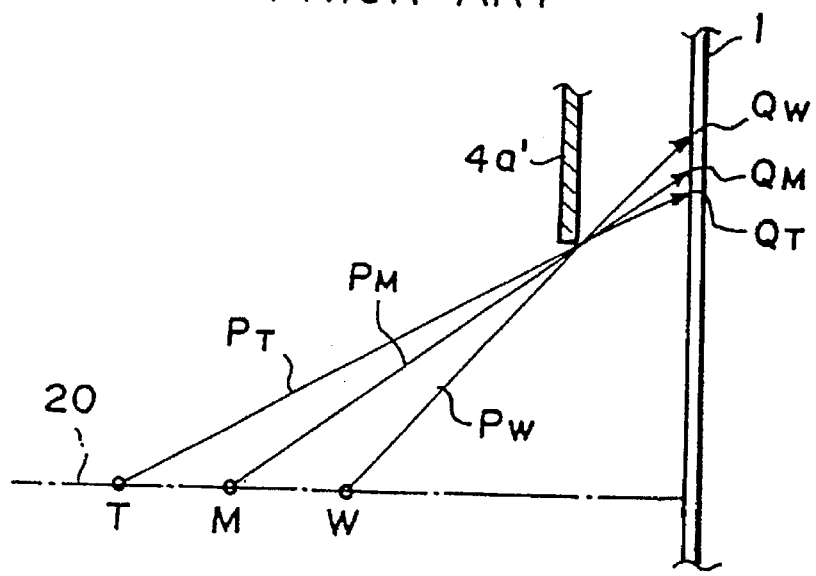
FIG. 3 is a schematic view for illustrating the problem inherent to the conventional variable-exposure-size camera.

In the conventional variable-exposure-size camera, the mask members are flat as shown in FIG. 3 (the upper mask member 4a' is shown in FIG. 3, by way of example), and accordingly the extreme edges which define the upper and lower edges of the effective opening area of the aperture are positioned far from the film surface (e.g., 1.5 mm to 2.0 mm) as compared with the aperture member. When the extreme edges are far from the film surface, the position where a light beam passing near the edge of the aperture impinges upon the film 1 largely changes with change in the position of the exit pupil as shown in FIG. 3. In FIG. 3, line PT represents a light beam which defines the upper edge QT of the exposure when the zoom lens is in the tele-side end, line PW represents a light beam which defines the upper edge QW of the exposure when the zoom lens is in the wide-side end, and line PM represents a light beam which defines the upper edge QM of the exposure when the zoom lens is in a middle position. T, M and W respectively denotes the positions of the exit pupil when the zoom lens is in the tele-side end, the middle position and the wide-side end. As can be understood from FIG. 3, in the conventional variable-exposure-size camera, the exposure size for a given position of the mask members largely changes with change in the position of the exit pupil.

Figure 4:
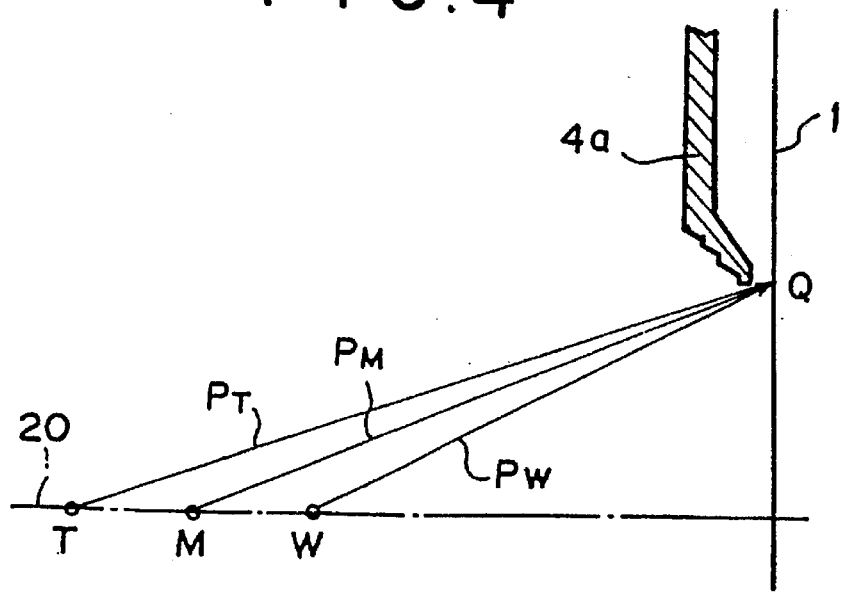
FIG. 4 is a schematic view for illustrating the operation of the variable-exposure-size camera of the first embodiment.

On the other hand, in the case of the variable-exposure-size camera of this embodiment where the extreme edges 4e and 4f which define the upper and lower edges of the effective opening area of the aperture 2 are positioned near the surface of the film 1, the light beam passing near the edge of the aperture impinges upon the film 1 in substantially the same position Q even if the position of the exit pupil changes as can be understood from FIG. 4, and accordingly the exposure size for a given position of the mask members hardly changes with change in the position of the exit pupil.

It is preferred that the surfaces of the extreme edges 4e and 4f facing the film 1 be spaced from the surface of the inner rails 22 by about 0.1 mm to 0.3 mm so that the edges 4e and 4f are not brought into contact with the film 1 when the film 1 and the mask members 4a and 4b are moved relative to each other, e.g., when the film 1 is fed or when the mask members 4a and 4b are moved to change the exposure size, in order to prevent the photosensitive surface of the film 1 from being damaged.

Though, in this embodiment, the mask members 4a and 4b define the upper and lower edges of the effective opening area of the aperture 2 for all the exposure sizes, the system may be arranged so that the mask members 4a and 4b can be retracted away from the aperture 2 and the aperture for Leica size is defined by the aperture member 3 itself.

The camera of this embodiment can be variously modified. For example, the shape of the edge portions 4c and 4d of the mask members 4a and 4b need not be limited to that shown in FIG. 2, but they may be of any shape so long as they can properly define the effective opening area of the aperture 2. Further the structure for driving the mask members 4a and 4b in response to movement of the cam member 8 need not be limited to that shown in FIG. 1. For example, the mask members 4a and 4b may be moved by rotating the pinion 6 by an electric motor controlled by a CPU. Further though, in this embodiment, the exposure size is changed in three stages, it may be changed in two stages or four or more stages.

A second embodiment of the present invention will be described with reference to FIGS. 5 and 6, hereinbelow. The structure of this embodiment is substantially the same as that of the first embodiment except that the edge portions of the mask members are moved away from the film 1 when the mask members and the film 1 are moved relative to each other and accordingly the parts analogous to those shown in FIGS. 1 and 2 are given the same reference numerals and will not be described here.

Figure 5:
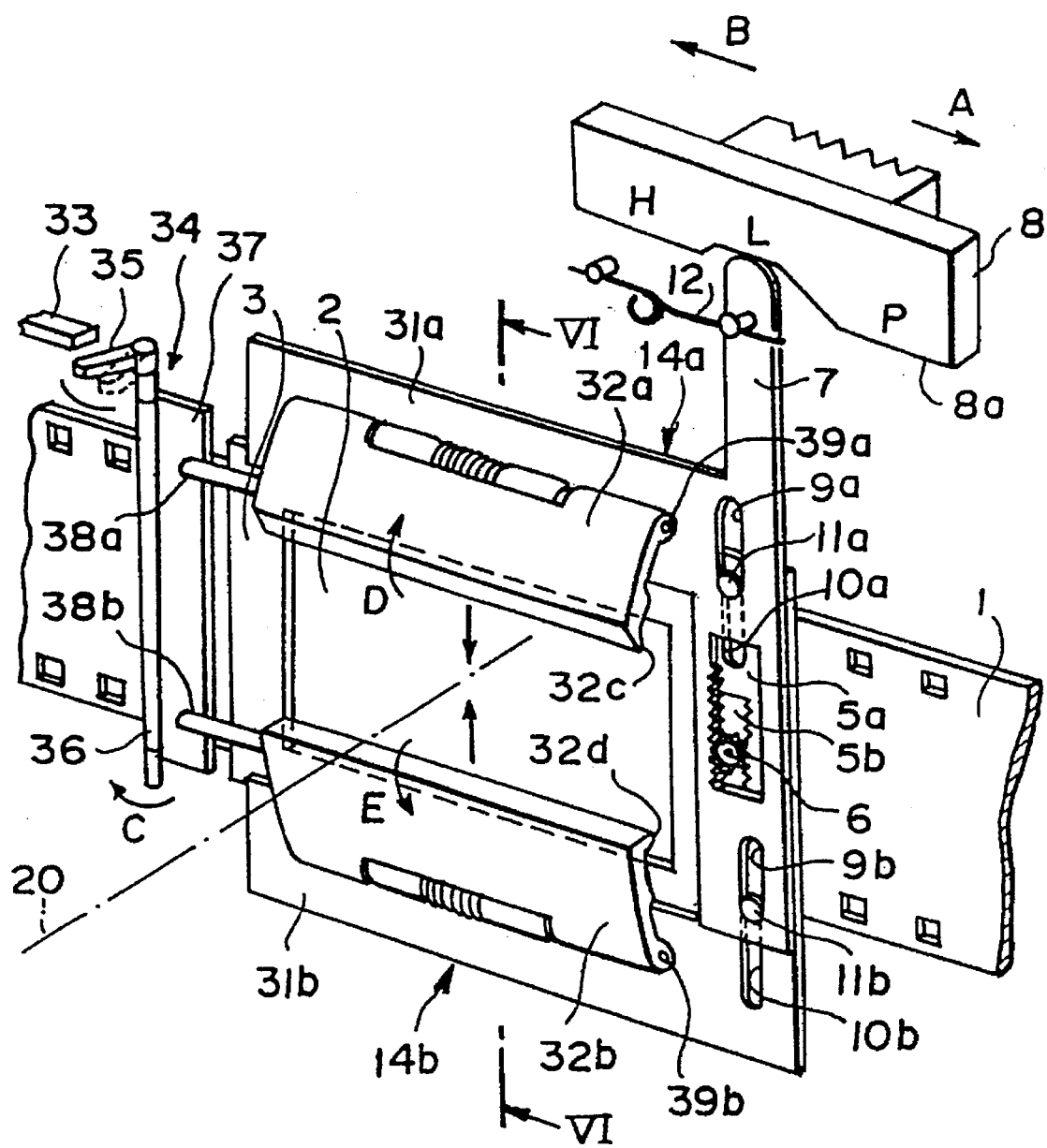
FIG. 5 is a schematic perspective view showing an important part of a variable-exposure-size camera in accordance with a second embodiment of the present invention.
Figure 6:
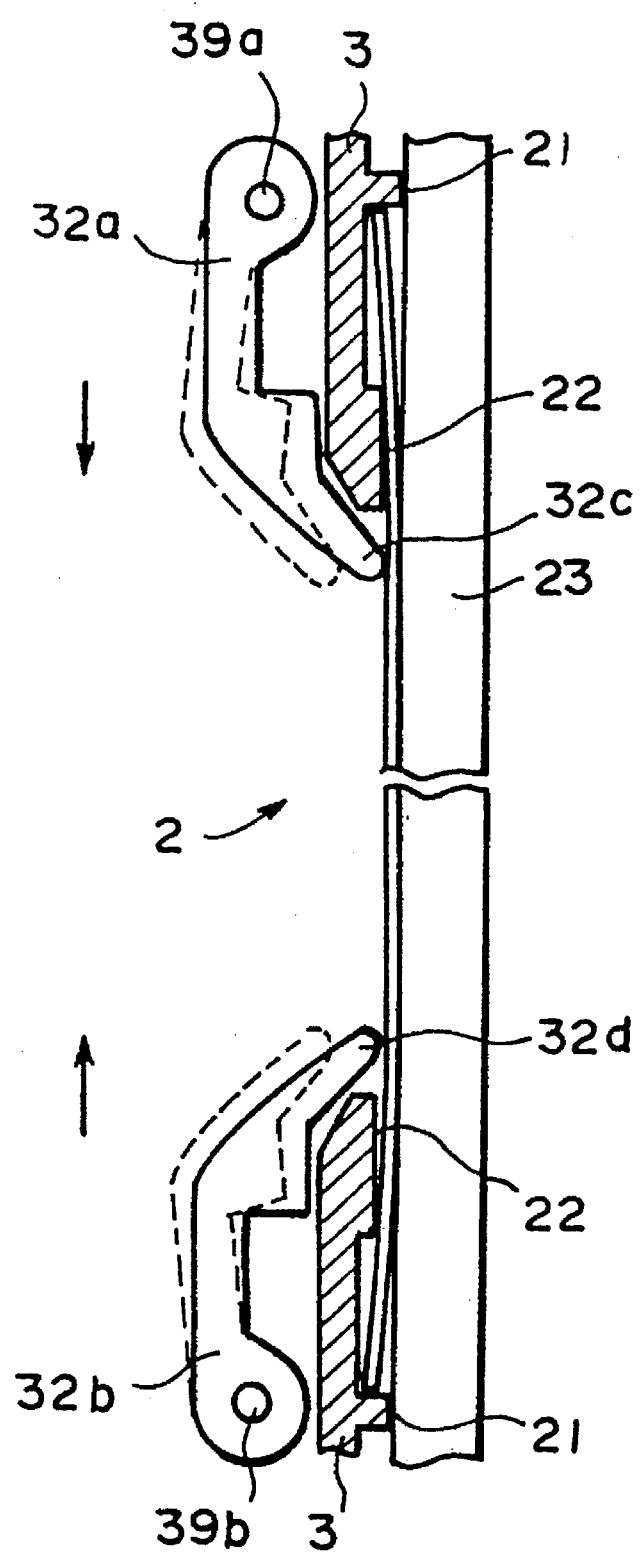
FIG. 6 is a fragmentary cross-sectional view taken along line VI—VI in FIG. 5.

In FIGS. 5 and 6, a pair of mask members 14a and 14b are provided in front of the aperture member 3. The mask members 14a and 14b comprises a pair of L-shaped plate members 31a and 31b which are substantially the same as the mask members 4a and 4b in the first embodiment and are moved up and down toward and away from each other by the similar mechanism as in the first embodiment. A movable edge portions 32a and 32b are mounted on the side of the respective plate members 31a and 31b remote from the film 1.

The movable edge portions 32a and 32b are hinged to the respective plate members 31a and 31b to be rotated toward and away from the film 1 between a closed position near the film 1 and an open position remote from the film 1. The movable edge portions 32a and 32b are urged toward the closed position under the force of springs built in the hinges. The movable edge portions 32a and 32b are substantially the same as the upper and lower edges of the aperture 2 in length. When the movable edge portions 32a and 32b are in the closed position shown by the solid line in FIG. 6, their extreme edges 32c and 32d abut against the surface of the film 1 and define the upper and lower edges of the effective opening area of the aperture 2.

When the mask members 14a and 14b and the film 1 are moved relative to each other, the movable edge portions 32a and 32b are moved to the open position away from the surface of the film 1. The mechanism for moving the movable edge portions 32a and 32b to the open position comprises a rotary plate 37 supported for rotation about a shaft 36, a pair of push levers 38a and 38b one ends of which are fixed to the rotary plate 37 and the other end portions of which are positioned between the movable edge portions 32a and 32b and the respective plate members 31a and 31b, a lever 35 which is fixed to the upper end of the shaft 36 to extend in perpendicular to the shaft 36 and an electromagnet 33 which attracts the lever 35 when energized. When the mask members 14a and 14b and the film 1 are moved relative to each other, e.g., when the film 1 is fed or when the mask members 14a and 14b are moved to change the exposure size, the electromagnet 33 is energized to attract the lever 35. When the lever 35 is attracted, the lever 35 is rotated to rotate the rotary plate 37 away from the film 1 as shown by arrow C, whereby the push levers 38a and 38b are rotated away from the film 1 to push the movable edge portions 32a and 32b so that they rotate in the directions of arrows D and E about pins 39a and 39b (FIG. 6) of the hinges away from the film 1 to the open position shown by the broken line in FIG. 6.

When feeding of the film 1 is finished or movement of the mask members 14a and 14b is finished, the electromagnet 33 is de-energized and the movable edge portions 32a and 32b are returned to the closed position under the force of the springs in the hinges.

The movable edge portions 32a and 32b may be moved to the open position by directly driving the pins 39a and 39b of the hinges or by directly attracting the movable edge portions 32a and 32b by electromagnets.

A third embodiment of the present invention will be described with reference to FIGS. 7 to 16, hereinbelow.

Figure 7:
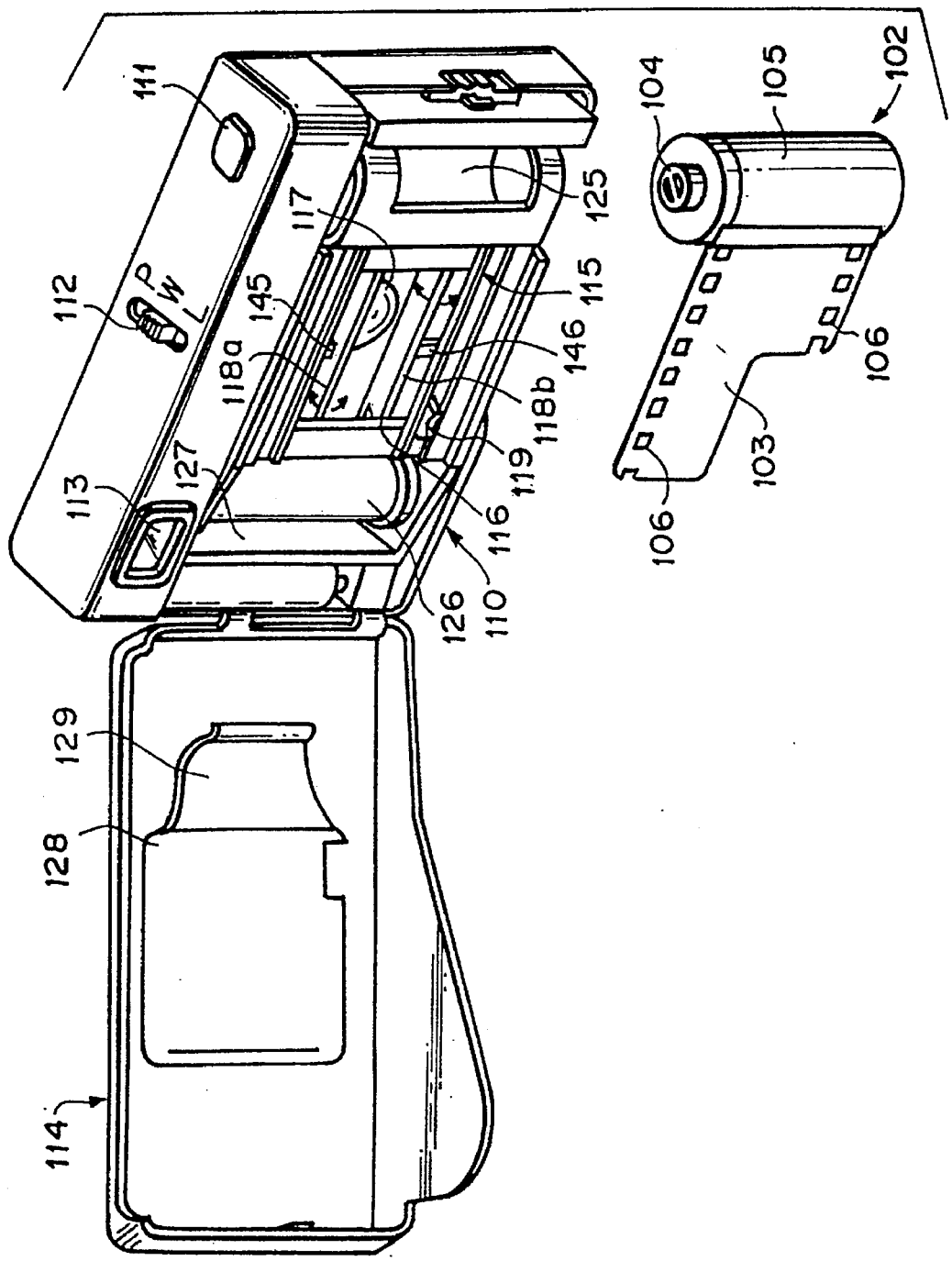
FIG. 7 is a perspective view showing a variable-exposure-size camera in accordance with a third embodiment of the present invention together with a roll film to be loaded in the camera with the back lid of the camera opened.

In FIG. 7, a 35 mm film magazine 102 comprises a 35 mm roll film 103, a spool 104 and a magazine body 105. The film 103 is provided with perforations 106 along the upper and lower edges thereof and exposure is made on the area between the upper and lower perforations 106. The camera in accordance with the fourth embodiment of the present invention has on its body 110 a shutter release button 111, an exposure size changing knob 112 for changing the exposure size and a finder 113. The exposure size changing knob 112 is slidable to position P (corresponding to panoramic size 103a shown in FIG. 11), position W (corresponding to wide size (high-vision size) 103b shown in FIG. 11) and position L (corresponding to Leica size 103c shown in FIG. 11). An aperture member 115 having an aperture 116 corresponding to Leica size is provided in the camera body 110. Reference numeral 117 denotes a taking lens, and reference numerals 118a an 118b denote a pair of mask members which are rotated in response to sliding movement of the exposure size changing knob 112. The mask members 118a and 118b are rotated in the direction of arrows in FIG. 7 and changes the effective opening area of the aperture 116. A sprocket 119 which is rotated in response to feed of the film 103.

The camera body 110 is provided with a magazine chamber 125 for receiving the film magazine 102 and a film take-up chamber 127 in which a take-up spool 126 is received. The camera body 110 has a back lid 114 and a pressure plate 128 for pressing the film 103 against the aperture member 115 and a film guide plate 129 for pressing the film 103 against the take-up spool 126 are mounted on the back lid 114.

Figure 8:
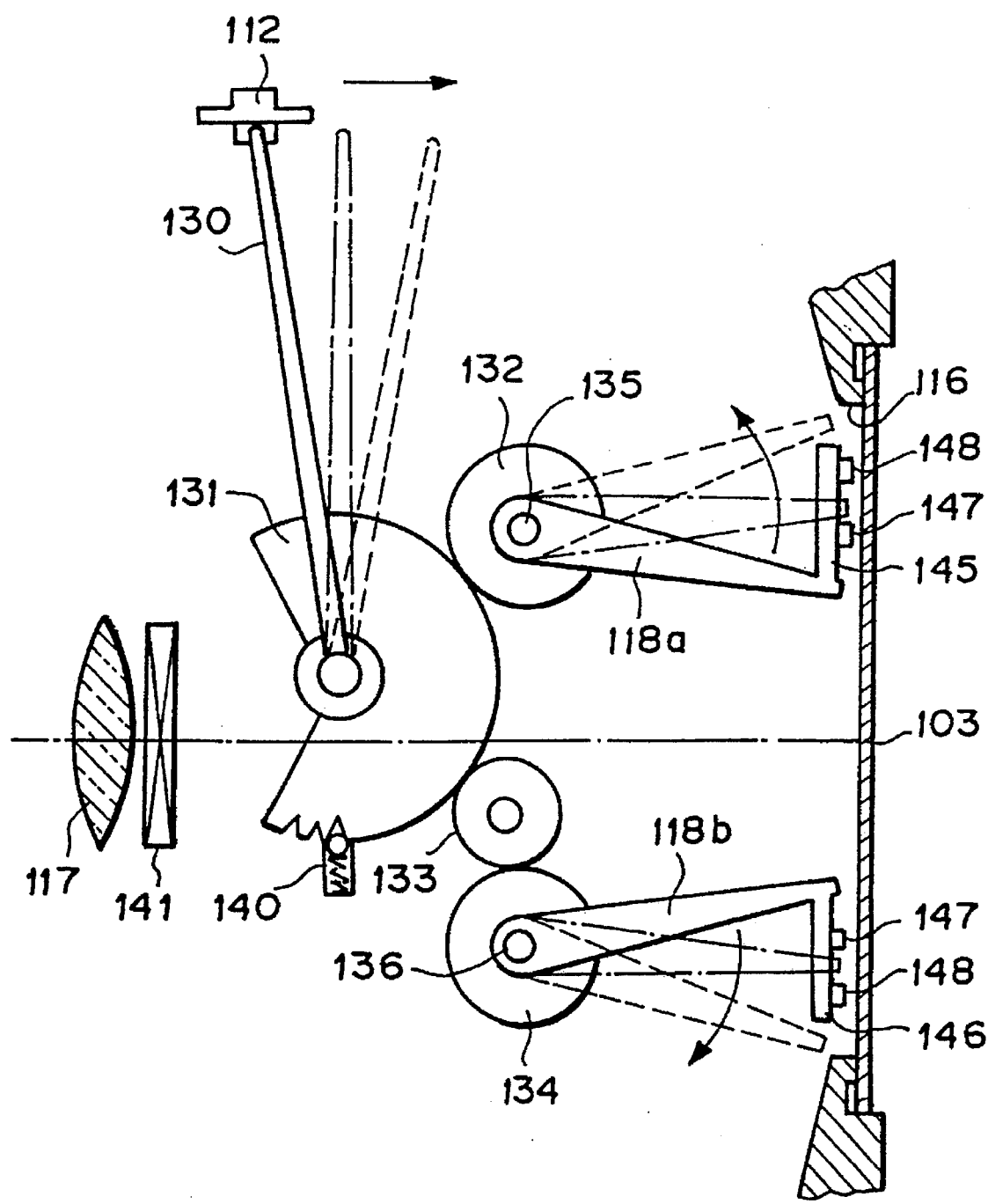
FIG. 8 is a schematic view showing an important part of the camera of the third embodiment.

FIG. 8 shows an example of a mask driving mechanism. In FIG. 8, the exposure size changing knob 112 is connected to a lever 130 which is fixed to a sector gear 131. The sector gear 131 is in mesh with gears 132 and 133, and the gear 133 is in mesh with a gear 134. The mask members 118a and 118b are formed integrally with shafts 135 and 136 of the gears 132 and 134, respectively. With this arrangement, the mask members 118a and 118b are rotated in response to slide of the exposure size changing knob 112.

The sector gear 131 is provided with a click-stop mechanism 140 and the click-stop mechanism 140 surely stops the exposure size changing knob 112 in one of the positions P, W and L and surely stops the mask members 118a and 118b in one of the positions shown by the solid line, the chained line and the broken line. For example when the exposure size changing knob 112 is set in position P, the mask members 118a and 118b are moved to the position shown by the solid line and the exposure size is set to panoramic size 103a. Similarly when the exposure size changing knob 112 is set to position W, the exposure size is set to wide size 103b, and when the exposure size changing knob 112 is set to position L, the exposure size is set to Leica size 103c. Reference numeral 141 denotes a shutter mechanism.

Figure 11:
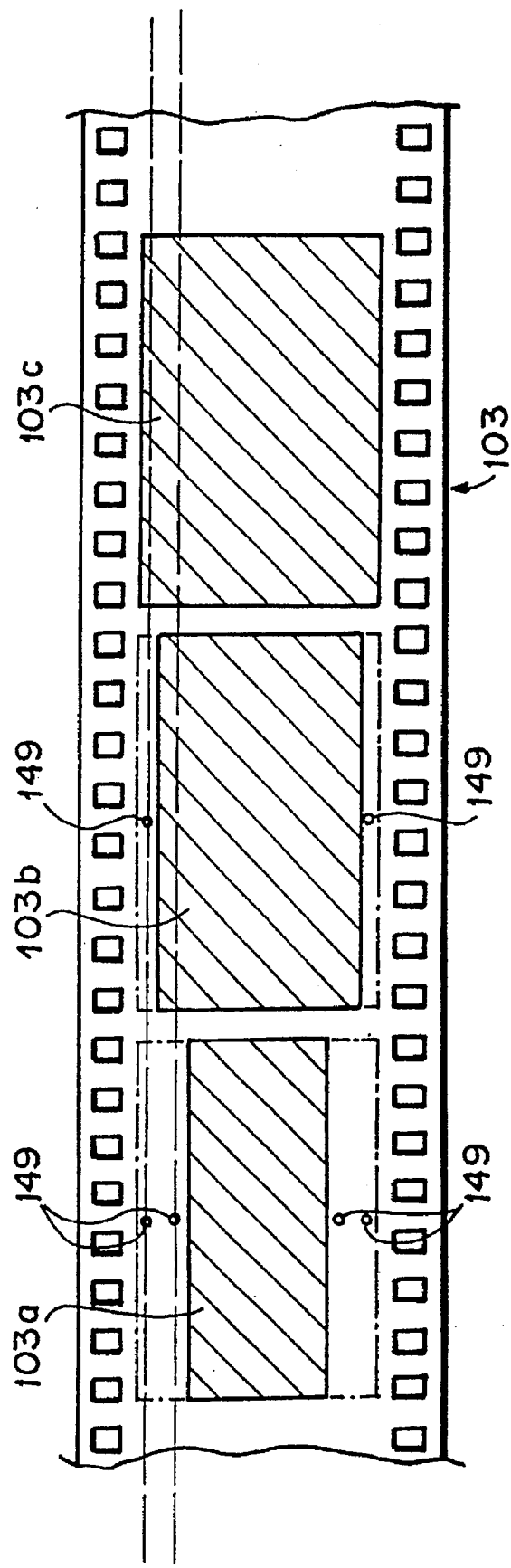
FIG. 11 is a schematic view showing a roll film exposed with the camera of the third embodiment.
Figure 12:
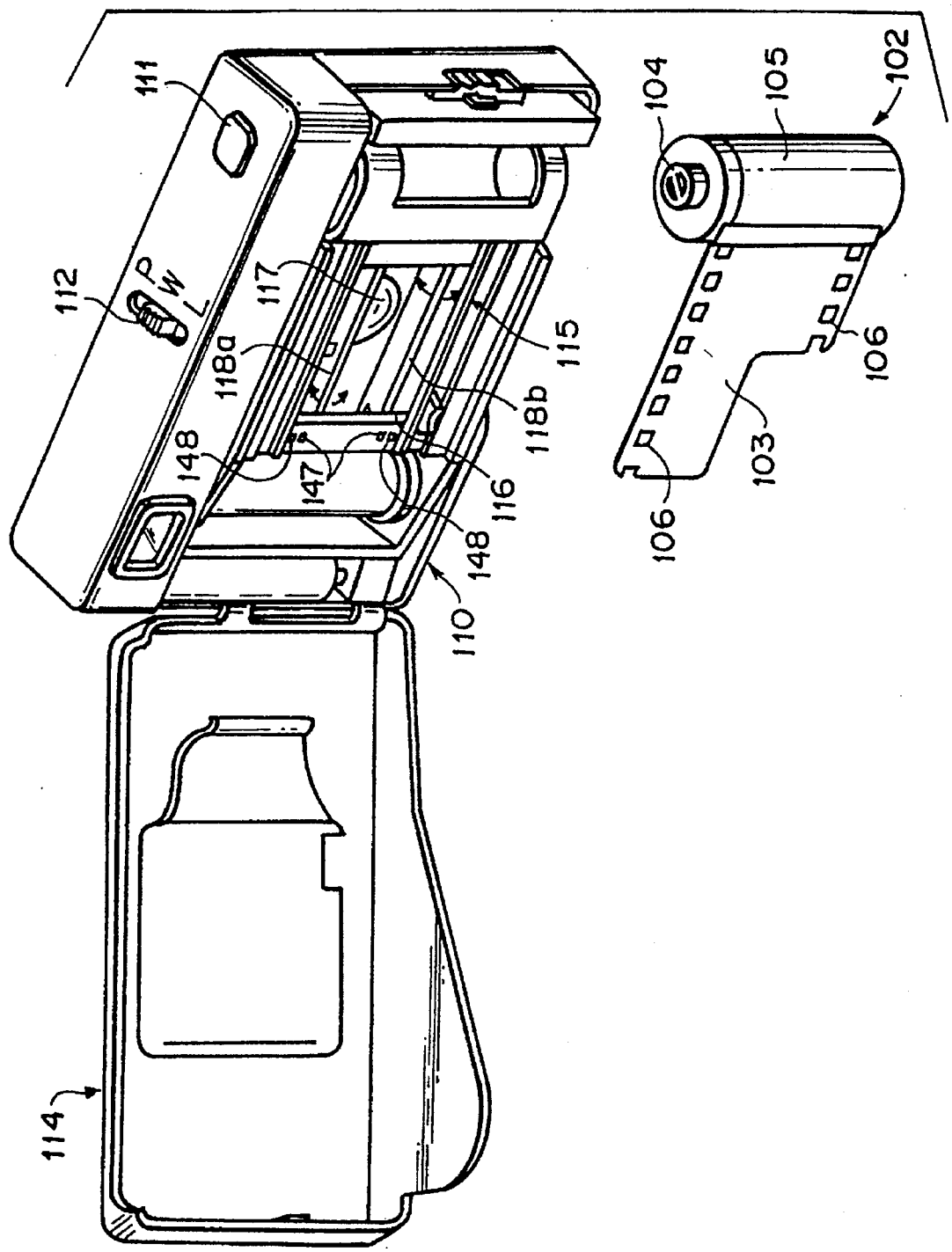
FIG. 12 is a view similar to FIG. 7 but showing a modification of the camera of the third embodiment.
Figure 13:
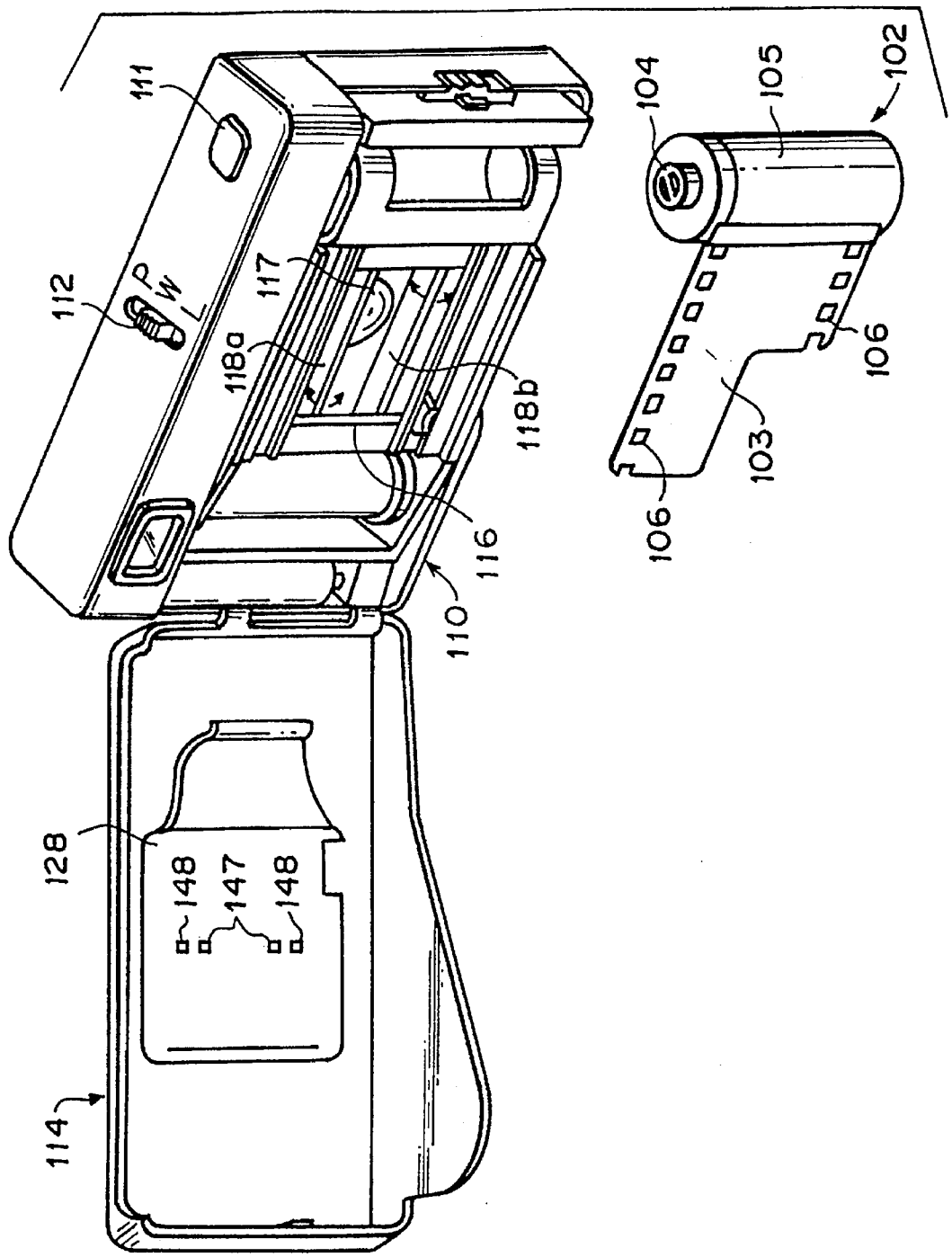
FIG. 13 is a view similar to FIG. 7 but showing another modification of the camera of the third embodiment.

The mask members 118a and 118b are respectively provided with tab portions 145 and 146 which are formed integrally therewith. A pair of LEDs 147 and 148 are mounted on each of the tab portions 145 and 146 arranged in the longitudinal direction of the film 103. The LEDs 147 and 148 are turned on and off by a CPU described later. The LEDs 147 and 148 are respectively provided with focusing lenses (not shown) on the front face thereof so that a spot image 149 (FIG. 11) is recorded on the film 103 when each of the LEDs 147 and 148 are turned on. LCDs, lamps or the like may be used in place of the LEDs. The LEDs 147 and 148 may be mounted on the aperture member 115 as shown in FIG. 12 or on the pressure plate 128 as shown in FIG. 13. In the case where the LEDs 147 and 148 are mounted on the aperture member 115, the LEDs 147 and 148 are turned on during take-up of the film 103. In the case of a camera where a so-called pre-winding system is employed, the LEDs 147 and 148 are provided on the side of the aperture member 115 nearer to the magazine chamber 125 and are turned on during rewinding.

Figure 9:
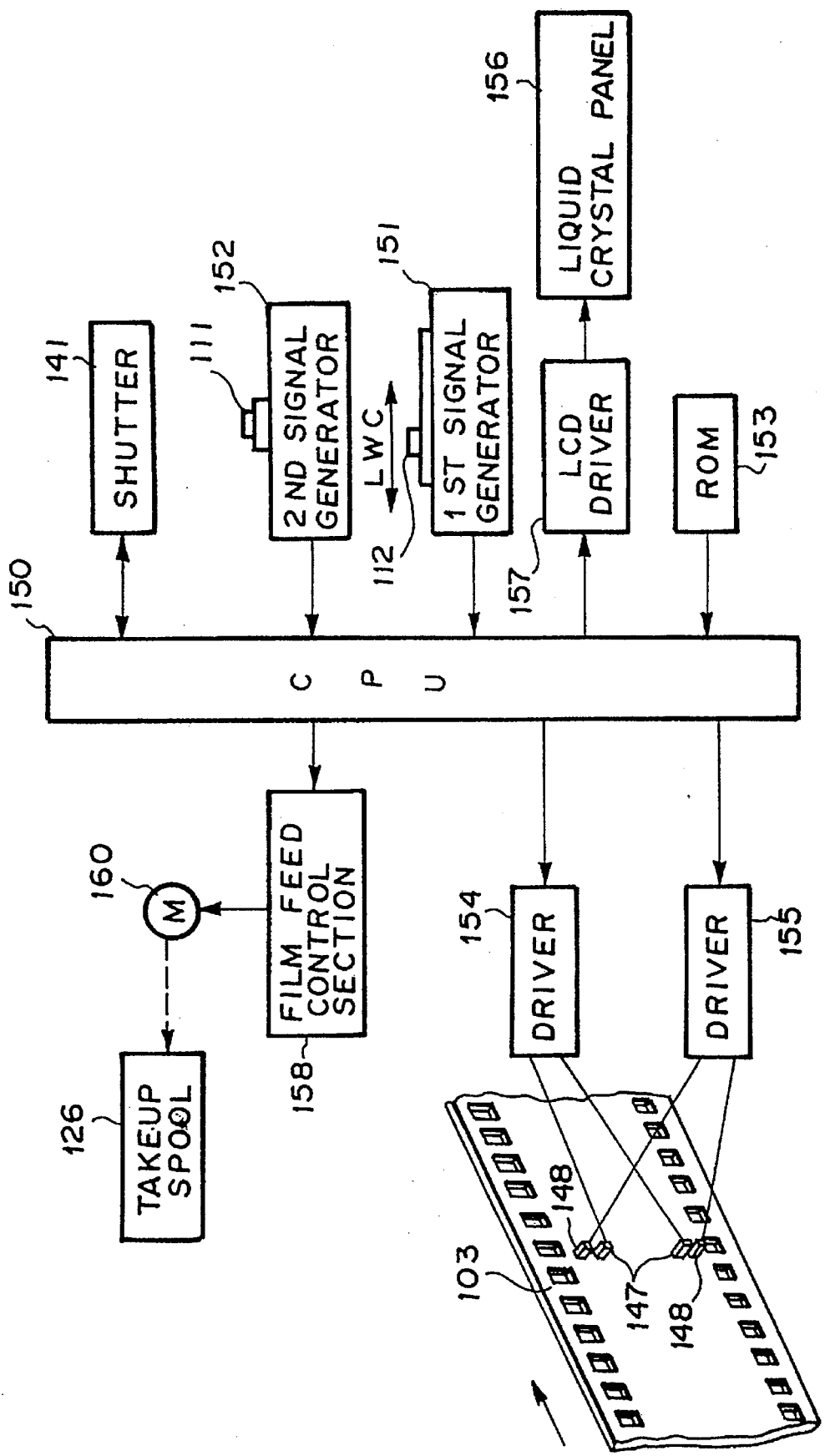
FIG. 9 is a schematic showing the electric arrangement of the camera.

As shown in FIG. 9, a first signal generator 151 which outputs a release signal when the shutter release button 11 is depressed, a second signal generator 152 which outputs an L-signal, a W-signal or a P-signal according to the position of the exposure size changing knob 112, the shutter mechanism 141 which outputs an exposure end signal and a ROM 153 which stores a sequence program for the camera are connected to the CPU 150.

Further the LEDs 147 and 148 are connected to the CPU 150 by way of drivers 154 and 155 and a liquid crystal panel 156 is connected to the CPU 150 by way of a LCD driver 157. Further a film feed control section 158 for control drive of the take-up spool 126 is connected to the CPU 150.

The CPU 150 turns on the LED 147 when a release signal is input while the W-signal is input and turns on both the LEDs 147 and 148 when a release signal is input while the P-signal is input. The LED 147 and/or the LED 148 is turned off in response to input of the exposure end signal into the CPU 150.

Figure 10A:
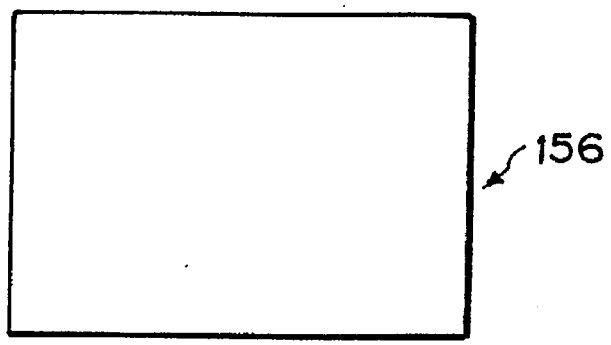
FIGS. 10A to 10C are views for illustrating various states of the filed of view of the viewfinder.
Figure 10B:
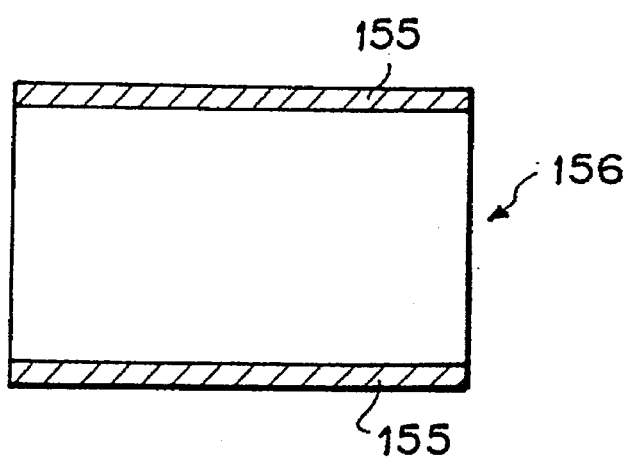
Figure 10C:
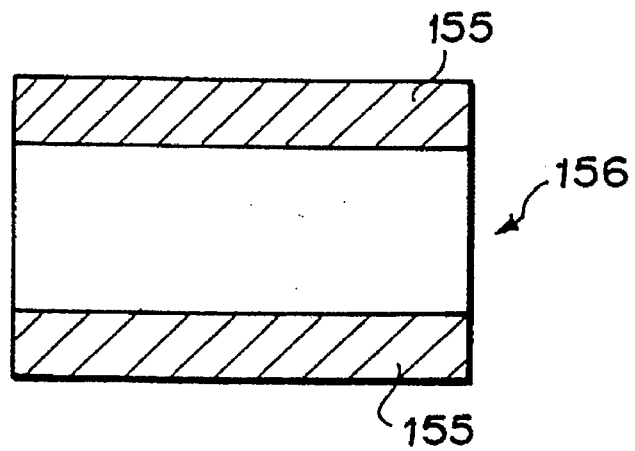

The liquid crystal panel 156 is disposed in the viewfinder 113 and the CPU 150 drives the liquid crystal panel 156 by way of the LCD driver 157 to make opaque a part of the panel 156 to change the filed of view of the viewfinder 113. That is, when neither the W-signal nor the P-signal is input into the CPU 150, that is, when the exposure size changing knob 112 is in position L, the CPU 150 does not drive the panel 156 and the field of view is left as it is as shown in FIG. 10A. The field of view at this time has an aspect ratio corresponding to that of Leica size. When the W-signal is input into the CPU 150, the CPU 150 drives the liquid crystal panel 156 to make opaque parts 55 of the panel 156 as shown in FIG. 10B. The field of view at this time has an aspect ratio corresponding to that of wide size. When the P-signal is input into the CPU 150, the CPU 150 drives the liquid crystal panel 156 to make opaque parts 55 of the panel 156 as shown in FIG. 10C. The field of view at this time has an aspect ratio corresponding to that of panoramic size.

The shutter mechanism 141 releases when a release signal is input from the CPU 150 and the film feed control section 158 drives the take-up spool 126 by way of an electric motor 160 to take up the film 103 by a length corresponding to one exposure when an exposure end signal is input from the CPU 150.

When a picture is to be taken in panoramic size, the exposure size changing knob 112 is set to position P, whereby the mask members 118a and 118b are set to the position shown by the solid line in FIG. 8. At the same time, the second signal generator 51 generates P-signal. Upon receipt of P-signal, the CPU 150 reads out the liquid crystal panel drive program corresponding to P-signal from the ROM 153 and drives the liquid crystal panel 153 on the basis of the program, whereby a part of the liquid crystal panel 156 is made opaque as shown in FIG. 10C.

When the release button 111 is depressed in this state and the release signal is input into the CPU 150, the CPU 150 inputs the release signal into the shutter mechanism 141 to drive it. When the shutter is opened, the film 103 is exposed to light from the object in panoramic size.

During the exposure, the CPU 150 drives the LEDs 147 and 148 to emit light. Since the LEDs 147 and 148 are in the aperture 116 and are opposed to the unexposed areas on the upper and lower sides of the exposure which are covered by the mask members 118a and 118b, each unexposed area is exposed to a pair of spot-like light beams. When developed, an image 103a in panoramic size is formed on the film 103 and a pair of spot images 149 are formed on each of the upper and lower sides of the image 103a as shown in FIG. 11. Thereafter the exposure end signal is input into the film feed control section 158 from the shutter mechanism 141 through the CPU 150. Upon receipt of the exposure end signal, the film feed control section 158 rotates the take-up spool 126 through the motor 160 to feed the film 103 by a length corresponding to one exposure, thereby setting another virgin part of the film 103 behind the aperture 116.

When a picture is to be taken in wide size, the exposure size changing knob 112 is set to position W, whereby the mask members 118a and 118b are set to the position shown by the chained line in FIG. 8. At the same time, the second signal generator 51 generates W-signal. Upon receipt of W-signal, the CPU 150 reads out the liquid crystal panel drive program corresponding to W-signal from the ROM 153 and drives the liquid crystal panel 153 on the basis of the program, whereby a part of the liquid crystal panel 156 is made opaque as shown in FIG. 10B.

When the release button 111 is depressed in this state and the release signal is input into the CPU 150, the CPU 150 inputs the release signal into the shutter mechanism 141 to drive it. When the shutter is opened, the film 103 is exposed to light from the object in wide size.

During the exposure, the CPU 150 drives only the LED 147 to emit light. Thus an image 103b in wide size is formed on the film 103 and a single spot image 149 is formed on each of the upper and lower sides of the image 103b as shown in FIG. 11. Thereafter the film feed control section 158 rotates the take-up spool 126 through the motor 160 to feed the film 103 by a length corresponding to one exposure, thereby setting another virgin part of the film 103 behind the aperture 116.

When a picture is to be taken in Leica size, the exposure size changing knob 112 is set to position L, whereby the mask members 118a and 118b are set to the position shown by the broken line in FIG. 8, where they are retracted away from the aperture. In this state, the upper and lower edges of the effective opening area of the aperture 116 are defined by the aperture member 115. Then the second signal generator 51 generates L-signal. Upon receipt of L-signal, the CPU 150 does not drive the liquid crystal panel to leave the aperture full open.

When the release button 111 is depressed in this state the film 103 is exposed to light from the object in Leica size.

During the exposure, the CPU 150 drives none of the LEDs 147 and 148. Thus an image 103c in Leica size is formed on the film 103 and no spot image 149 is formed on either of the upper and lower sides of the image 103c as shown in FIG. 11.

In the case of the image taken by the camera of this embodiment, the size of the exposure can be precisely detected by detecting the number of the spot image(s) 149 even if the image taken is such that the edges of the exposure is not clear, e.g., an image of a night view without stars or an image of a night view without street lamps or neon signs.

Figure 14:
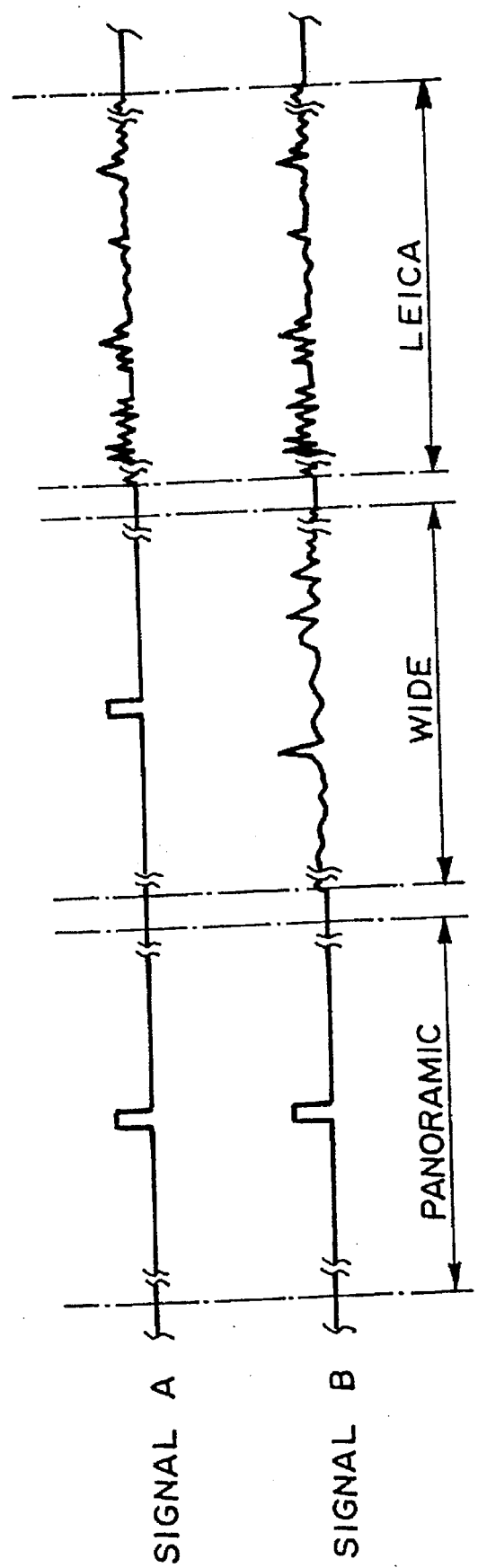
FIG. 14 is a view showing an example of waveforms of detecting signals output from a pair of photosensors which detects the spot images recorded on the film shown in FIG. 11.
Figure 15:
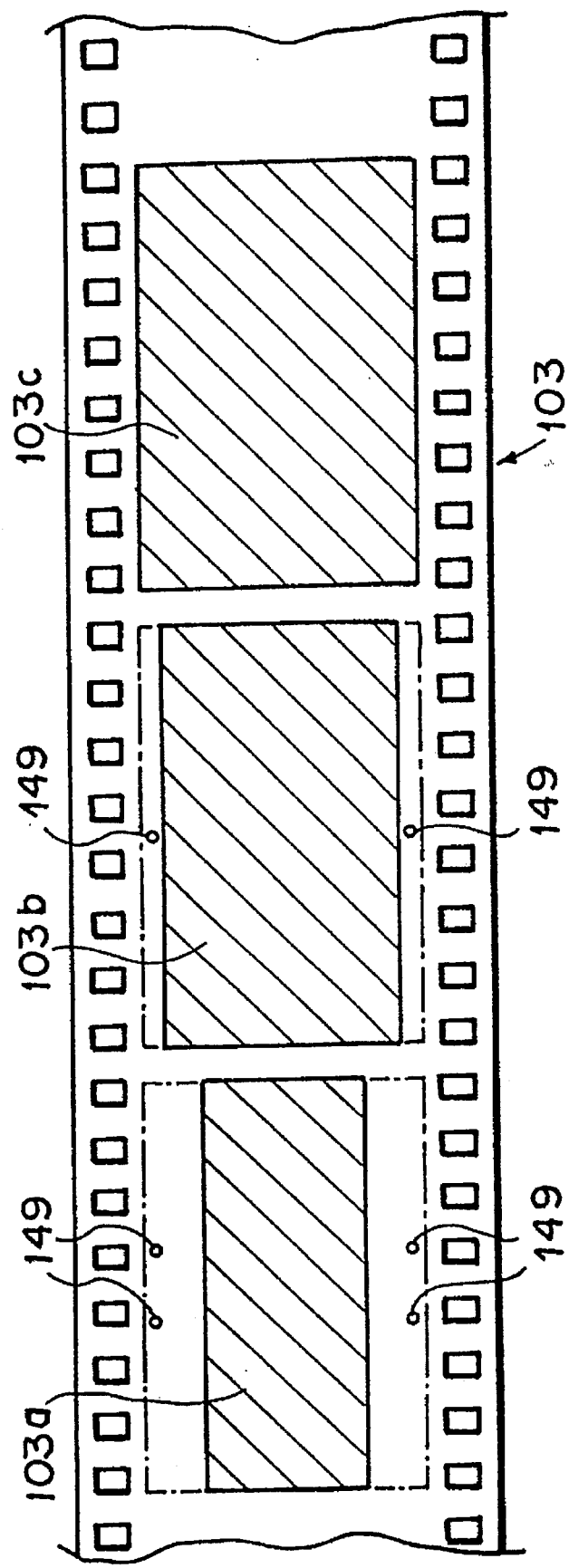
FIG. 15 is a view similar to FIG. 11 but showing a roll film exposed with a camera in accordance with a still another modification of the camera of the third embodiment.

When a pair of optical sensors are disposed in the positions shown by the chained line in FIG. 11 to detect the spot image 149 for each exposure during film feeding, the detecting signals A and B output from the optical sensors are as shown in FIG. 14. The output level of each signal is low in the unexposed area and high at the spot image, and accordingly, the spot image 149 clearly detected. Thus in the film exposed with the camera of this embodiment, by providing a printer with such optical sensors along the film feeding path, the exposure sizes can be precisely determined.

In the case of an image of a night view with stars or an image of a night view with lighted street lamps or neon signs taken by the camera of this embodiment in Leica size, the image includes images of stars, street lamps and/or neon signs. However since these images are generally scattered, they can be easily distinguished from the spot images 149 and also in such images, the size of the exposure can be precisely detected by detecting the number of the spot image(s) 149. In the case of Leica size exposure, the detecting signals A and B output from the optical sensors have irregular output levels as shown in FIG. 14.

Instead of the spot images 149, images of different shapes such as of rectangular, square or the like may be recorded on the unexposed part of the film 103. Further, though in the embodiment described above, the LEDs 147 and 148 are arranged in the direction of width of the aperture 116, they may be arranged in the longitudinal direction of the same. In this case, one or two spot images 149 are recorded on the unexposed part of the film 103 in the manner shown in FIG. 15.

Further the effect substantially the same as that obtained in the embodiment described above can be obtained by providing a single LED on the aperture member 115 or the pressure plate 128 to be opposed to the area which is not exposed when the exposure size is set to wide size and turning it on by different times according to the exposure size set. That is, when the film is taken up after exposure in wide size, the LED is turned on once and when the film is taken up after exposure in panoramic size, the LED is turned on twice at a predetermined interval, while after exposure in Leica size, the LED is not turned on. The spot images 149 recorded in this manner are the same as those shown in FIG. 15. When the spaces between a pair of spot images 149 for indicating panoramic size are kept constant, the panoramic size exposures can be detected on the basis of the space between the spot images 149 as well as the number of the same, whereby detection of the panoramic size exposures can be effected more precisely.

Figure 16:
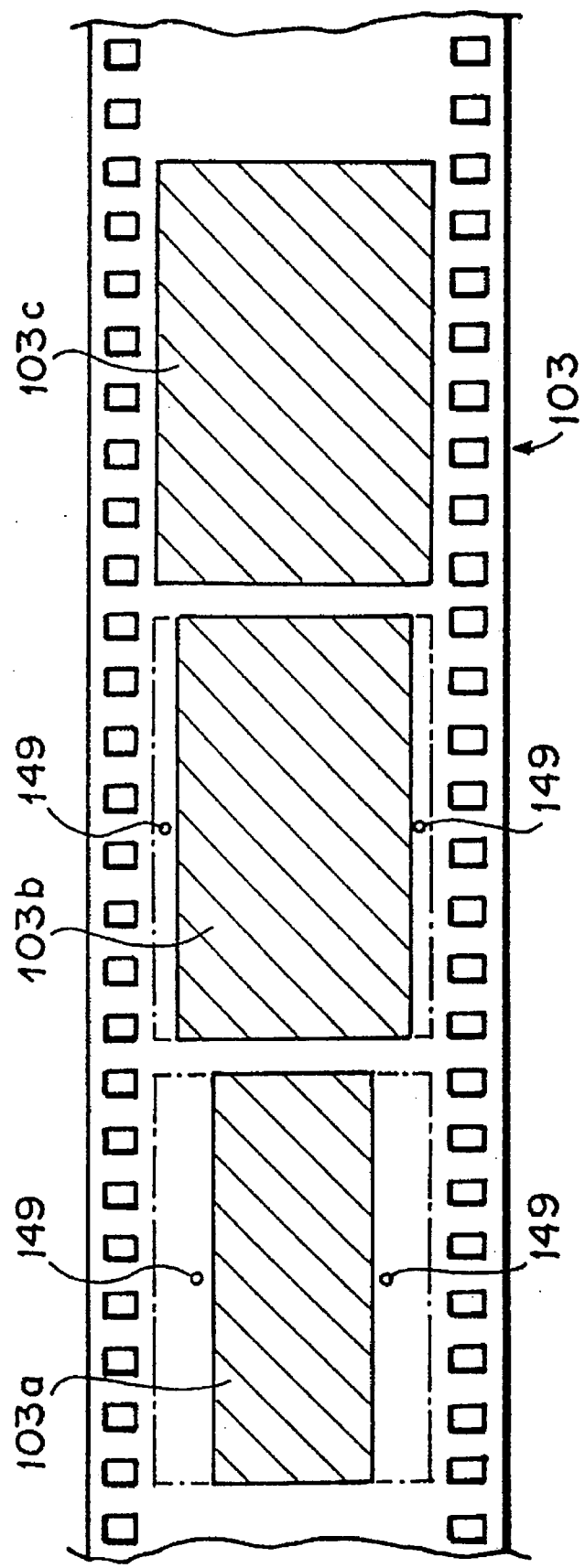
FIG. 16 is a view similar to FIG. 11 but showing a roll film exposed with a camera in accordance with a still another modification of the camera of the third embodiment.

The exposure sizes may be distinguished from the position of a single spot image 149 instead of the number of the spot images 149. That is, in the case of a panoramic size exposure, a single spot image 149 is recorded relatively far from the edge of the film and in the case of a wide size exposure, a single spot image 149 is recorded relatively near the edge of the film as shown in FIG. 16.

Though, in the embodiment described above, the spot images are recorded on opposite sides of the exposure, they may be recorded on either side of the exposure. In this case, the spot image 149 can be recorded by use of a LED in a date recording mechanism. Though, in the embodiment described above, the exposure size can be changed to two sizes in addition to Leica size, it may be arranged so that the exposure size can be changed to only one size besides Leica size. Further it is possible to cover the left and right edge portions of the aperture so that a square exposure or a half size exposure can be obtained. In such a case, the information on the size of exposure is recorded on the left and/or right side of the exposure.

A fourth embodiment of the present invention will be described with reference to FIGS. 17 to 20, hereinbelow.

Figure 17:
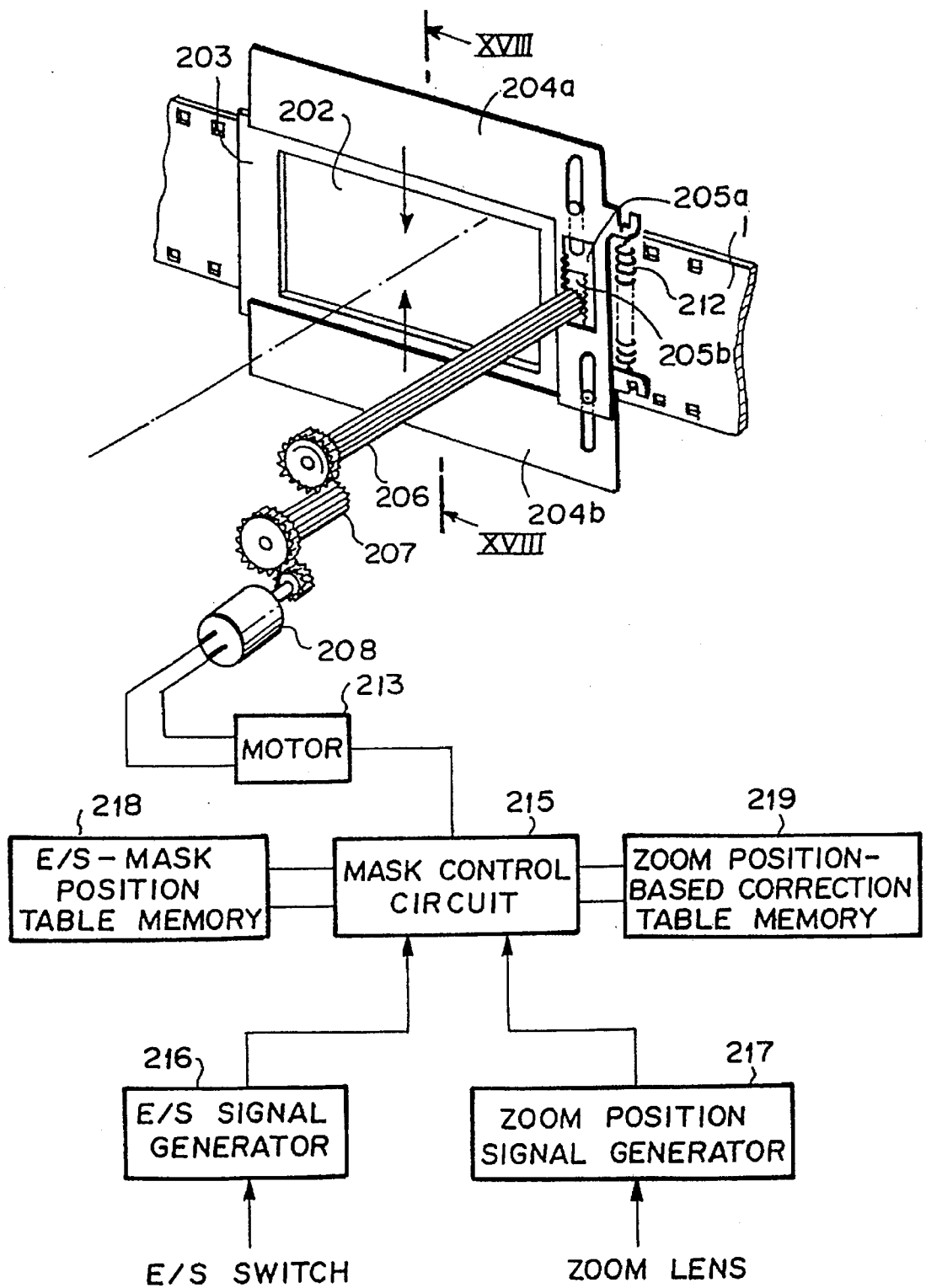
FIG. 17 is a schematic perspective view showing an important part of a variable-exposure-size camera in accordance with a fourth embodiment of the present invention.

In FIG. 17, a pair of mask members 204a and 204b are supported in front of a mask member 203 to be movable up and down in a manner similar to that described above in conjunction with the first embodiment. The mask members 204a and 204b are driven by an electric motor 208 by way of gears 106 and 207 in mesh with racks 205a and 205b. The mask members 204a and 204b are urged toward each other under the force of a weak spring 212.

Figure 18:
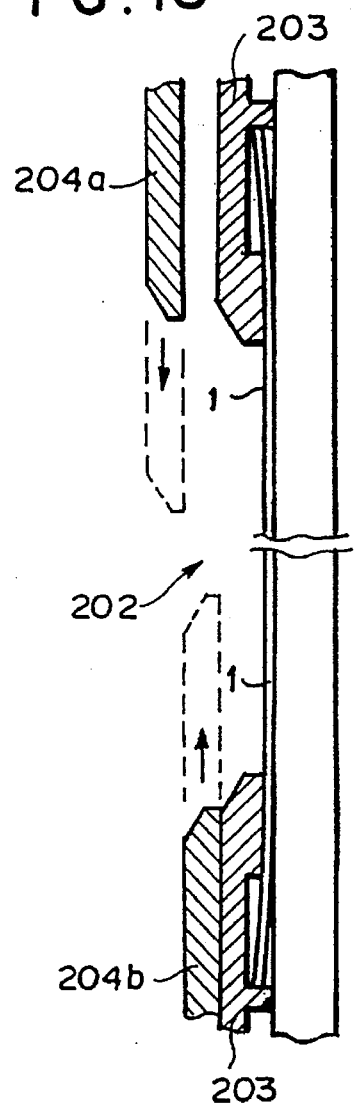
FIG. 18 is a fragmentary cross-sectional view taken along line VIII—VIII in FIG. 17.

As shown in FIG. 18, the mask members 204a and 204b are flat and the edge portions thereof are not bent toward the film surface unlike in the first and second embodiments. Accordingly, when the mask members a 204a and 204b are set without taking into account the position of the exit pupil of the taking lens, the actual exposure size varies with change in the position of the exit pupil as described above in conjunction with FIG. 3. In this embodiment, the position of the mask members 204a for each selected exposure size is adjusted according to the position of the zoom lens (corresponding to the position of the exit pupil) which is the taking lens in this particular embodiment. As can be understood from FIG. 19, the actual exposure size can be kept constant irrespective of the position of the exit pupil by shifting inward the mask members 204a and 204b as the exit pupil of the taking lens becomes closer to the film surface, i.e., as the position of the zoom lens system becomes closer to the wide-side end.

In order to adjust the position of the mask members 204a and 204b according to the position of the zoom lens system, a mask control circuit 215 controls the electric motor 208 by way of a motor drive circuit 213.

As shown in FIG. 17, an E/S (exposure size) signal generator 216 which outputs a signal representing the exposure size selected by the user through an exposure switch and a zoom position signal generator 217 which outputs a signal representing the position of the zoom lens system determined according to a signal from the zoom lens are connected to the mask control circuit 215. A first memory 218 store the following table 1 in which the position of the mask members 204a and 204b is related to the exposure size selected and a second memory 219 stores the following table 2 in which a correction value for correcting the position of the mask members 204a and 204b is related to the position of the zoom lens system.

TABLE 1

| exposure size | Leica | high-vision | panoramic |
| mask position | retracted | position H | position P |

TABLE 2

|  | Leica | high-vision | panoramic |
| --- | --- | --- | --- |
| tele-side range | 0 | h1 | p1 |
| middle range | 0 | 0 | 0 |
| wide-side range | 0 | h2 | p2 |

Figure 19:
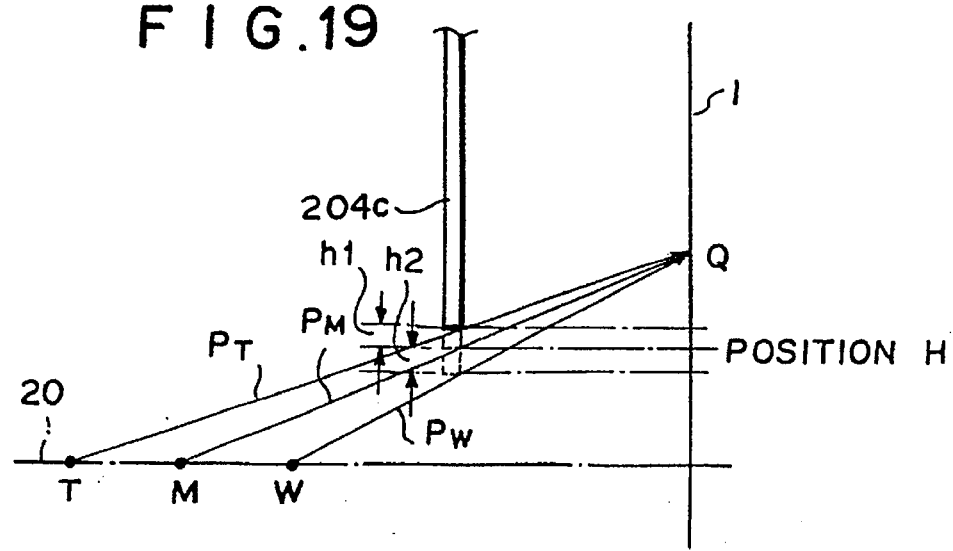
FIG. 19 is a schematic view for illustrating the operation of the variable-exposure-size camera of the fourth embodiment.

In this embodiment, when Leica size is selected, the mask members 204a and 204b are retracted from the aperture 202, that is, the effective aperture is defined by the aperture member 203 itself. Accordingly, the correction value is 0 irrespective of the position of the zoom lens system (or position of the exit pupil) as shown in Table 2. As can be understood from tables 1 and 2, when the high-vision size is selected and the zoom lens system is in the middle range, the mask members 204a and 204b are moved to a position H while when the high-vision size is selected and the zoom lens system is in the tele-side range, the mask members 204a and 204b are moved to a position shifted outward from the position H by a distance h1 and when the high-vision size is selected and the zoom lens system is in the wide-side range, the mask members 204a and 204b are moved to a position shifted inward from the position H by a distance h2 as shown in FIG. 19. Similarly when the panoramic size is selected and the zoom lens system is in the middle range, the mask members 204a and 204b are moved to a position P while when the panoramic size is selected and the zoom lens system is in the tele-side range, the mask members 204a and 204b are moved to a position shifted outward from the position P by a distance p1 and when the panoramic size is selected and the zoom lens system is in the wide-side range, the mask members 204a and 204b are moved to a position shifted inward from the position P by a distance p2.

Figure 20:
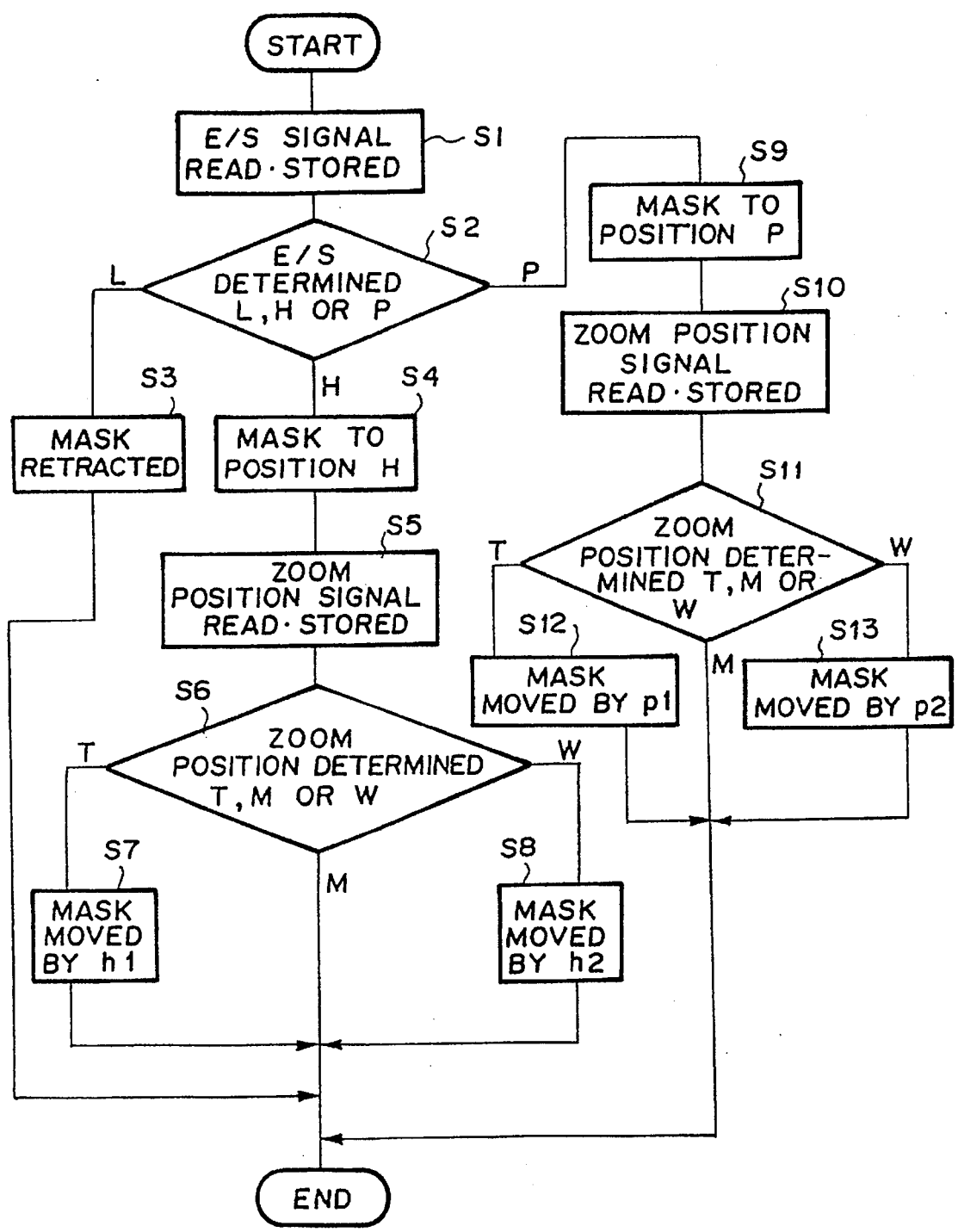
FIG. 20 is a flow chart for illustrating the operation of the mask control circuit in the fourth embodiment.

Now the operation of the mask control circuit 215 will be described in more detail with reference to the flow chart shown in FIG. 20, hereinbelow.

The mask control circuit 215 first reads the output signal of the E/S signal generator 216 and stores it. (step S1) Then the mask control circuit 215 determines the exposure size selected by the user of the camera. (step S2) When it is determined that the exposure size selected is Leica size, the mask control circuit 215 causes the motor 208 to retract the mask members 204a and 204b from the aperture 202. (step S3) When it is determined in step S2 that the exposure size selected is high-vision size, the mask control circuit 215 causes the motor 208 to move the mask members 204a and 204b to the position H in step S4 and then reads and stores the output signal of the zoom position signal generator 217 in step S5. Then the mask control circuit 215 determines the position of the zoom lens system in step S6. When it is determined that the zoom lens system is in the tele-side range, the mask control circuit 215 causes the motor 208 to move outward the mask members 204a and 204b from the position H by a distance h1. (step S7) When it is determined in step S6 that the zoom lens system is in the middle range, the mask control circuit 215 does not actuate the motor 208 but leaves the mask members 204a and 204b in the position H. When it is determined in step S6 that the zoom lens system is in the wide-side range, the mask control circuit 215 causes the motor 208 to move inward the mask members 204a and 204b from the position H by a distance h2. (step S8) When it is determined in step S2 that the exposure size selected is panoramic size, the mask control circuit 215 causes the motor 208 to move the mask members 204a and 204b to the position P in step S9 and then reads and stores the output signal of the zoom position signal generator 217 in step S10. Then the mask control circuit 215 determines the position of the zoom lens system in step S11. When it is determined that the zoom lens system is in the tele-side range, the mask control circuit 215 causes the motor 208 to move outward the mask members 204a and 204b from the position P by a distance p1. (step S12) When it is determined in step S11 that the zoom lens system is in the middle range, the mask control circuit 215 does not actuate the motor 208 but leaves the mask members 204a and 204b in the position P. When it is determined in step S11 that the zoom lens system is in the wide-side range, the mask control circuit 215 causes the motor 208 to move inward the mask members 204a and 204b from the position P by a distance p2. (step S14)

In this embodiment, when high-vision size or panoramic size is selected, the mask members 204a and 204b are once moved to the position H or P, corresponding to the middle range of the zoom lens system, irrespective of the position of the zoom lens system and then moved from the position H or P when the zoom lens system is in the tele-side range or the wide-side range. However, it is possible to calculate the final position of the mask members 204a and and 204b on the basis of both the exposure size selected and the position of the zoom lens system and to move the mask members 204a and 204b directly to the final position. Further though, in this embodiment, the position of the zoom lens system is divided into three steps and the position of the mask members 204a and 204b are corrected stepwise according to the range of the position of the zoom lens system, the position of the mask members 204a and 204b may be corrected continuously according to the position of the zoom lens system.

The E/S-mask position table memory 218, the zoom position-based correction table memory 219 and the mask control circuit 215 may be formed of a CPU or a memory which exists in the camera.

Though, in the embodiments described, the present invention is applied to a photographic camera having a zoom lens system as the taking lens, the present invention can be also applied to cameras having a multiple focal length lens system as the taking camera and to cameras whose taking lens is interchangeable.

What is claimed is:

1. A variable-exposure-size camera comprising an aperture member which defines an aperture through which a photographic film positioned behind the aperture member is exposed to light passing through a taking lens and a mask means which is disposed between the aperture member and the taking lens and is driven by a mask drive means to change an effective edge of the aperture, thereby narrowing the effective opening area of the aperture, characterized by having an exposure size input means which is operated by a user of the camera and inputs the exposure size selected by the user, an exit pupil position detecting means which detects the position of the exit pupil of the taking lens and a controller which determines a position of the mask means where the actual exposure size conforms to the exposure size selected by the user responsive to the detection of the position of the exit pupil of the taking lens by said exit pupil position detecting means and which causes the mask drive means to move the mask means to the position determined, the mask drive means driving the mask means in directions that are simultaneously parallel to a plane of the photographic film and perpendicular to the length of the photographic film, both with a movement responsive to the exposure size input means and with a further movement responsive to the exit pupil position detecting means.

2. A variable-exposure-size camera as defined in claim 1 in which said taking lens is a zoom lens system and the position of said exit pupil is detected through the position of the zoom lens system.

3. A variable-exposure-size camera as defined in claim 2 in which said mask means is once moved to a reference position for the exposure size input by the exposure size input means and then moved to the position determined by the controller responsive to the detection of the position of the exit pupil of the taking lens by said exit pupil position detecting means.

4. A variable-exposure-size camera as defined in claim 3 in which said position of the zoom lens system is divided into a tele-side range, a middle range and a wide-side range and said reference position is the position where the actual exposure size conforms to the exposure size selected by the user when the zoom lens system is in the middle range.

* * * * *